United States Patent [19]

Dezern

[11] Patent Number: 4,750,753

[45] Date of Patent: Jun. 14, 1988

[54] BUMPER MOUNTED FOLDING STEP ASSEMBLY

[76] Inventor: Morris L. Dezern, 10609 Harrison La., Fairdale, Ky. 40118

[21] Appl. No.: 832,357

[22] Filed: Feb. 24, 1986

Related U.S. Application Data

[63] Continuation-in-part of Ser. No. 646,017, Aug. 15, 1984.

[51] Int. Cl.$^4$ ............................................... B60R 3/02
[52] U.S. Cl. .............................. 280/164 R; 224/42.44; 280/166; 293/117; 296/1 C
[58] Field of Search ................... 280/163, 166, 164 R; 296/62, 1 C; 108/44; 224/42.21, 42.44, 42.43; 182/91; 293/117

[56] References Cited

U.S. PATENT DOCUMENTS

| | | | |
|---|---|---|---|
| 2,158,949 | 5/1939 | Sarles et al. | 182/91 |
| 4,172,611 | 10/1979 | Krus | 296/1 C |
| 4,274,648 | 6/1981 | Robins | 280/166 |
| 4,299,420 | 11/1981 | Piepho | 296/1 C |

FOREIGN PATENT DOCUMENTS 1570637  6/1969  France ................................ 280/770

*Primary Examiner*—Robert J. Spar
*Assistant Examiner*—Donald W. Underwood
*Attorney, Agent, or Firm*—Edward M. Steutermann

[57] ABSTRACT

A folding step assembly adapted for attachment to a vehicle with a base having an outwardly extending peripheral flange where the assembly can be attached to the bumper, for example in the area where a license plate is normally held. A first step is hingably connected to a lower edge portion of the base by a hinge device and adapted to be tilted between an extended horizontal position and a stored vertical position against the flange of the supporting plate. A bias device such as a spring is fitted around the hinge pin to bias the first step to a normally vertical position generally parallel to the supporting plate with the step abutting the flange. A second step can be provided so when the first step is pivoted to an angular position, relative to a horizontal position, the outer edge of the first step engages a notch of the second step which is hingably connected to an upper edge portion of the base to support the second step which can be pivoted from a first position parallel to the base in a position extending horizontally outwardly from the base. An elastomeric bumper can be provided on the base to engage the second step when the second step is in the vertical position. The first and the second steps can include an elastomeric bumper to engage the other step to prevent rattling in the stored position.

10 Claims, 4 Drawing Sheets

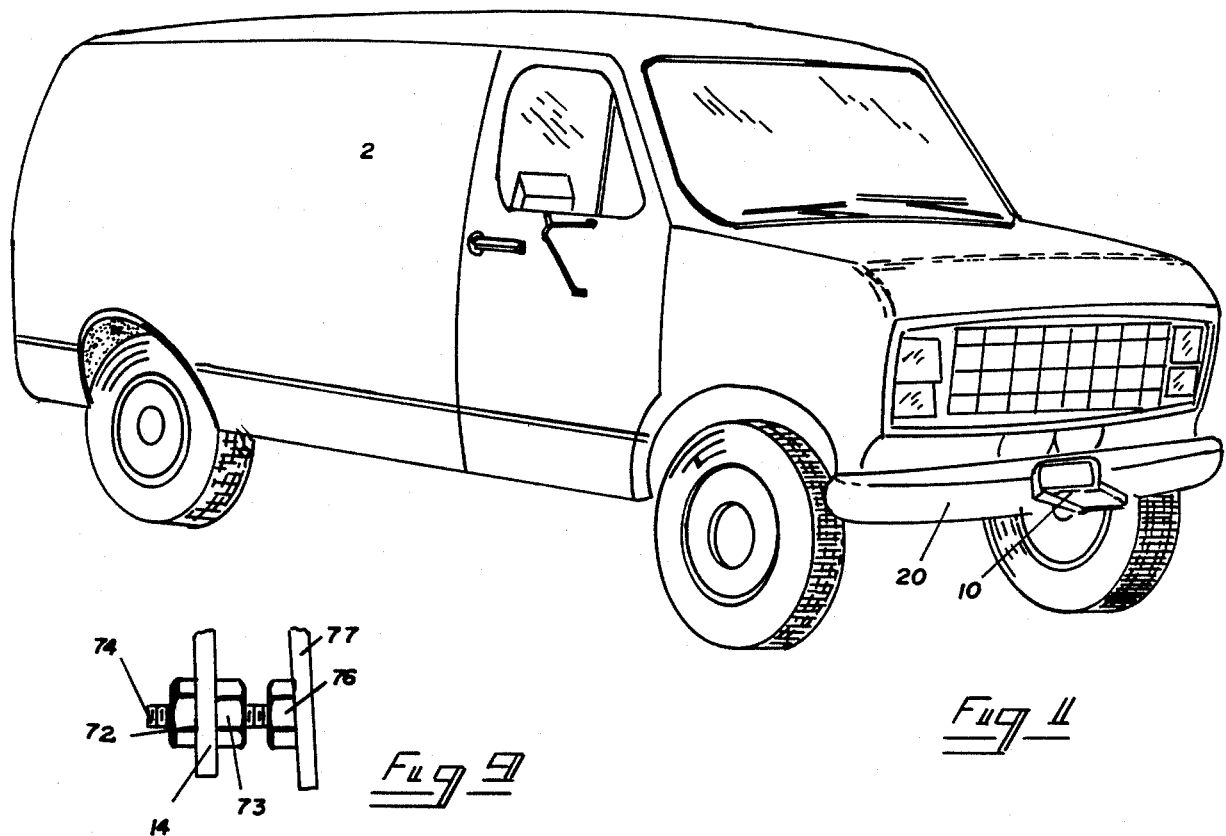
Fig 1
Fig 9
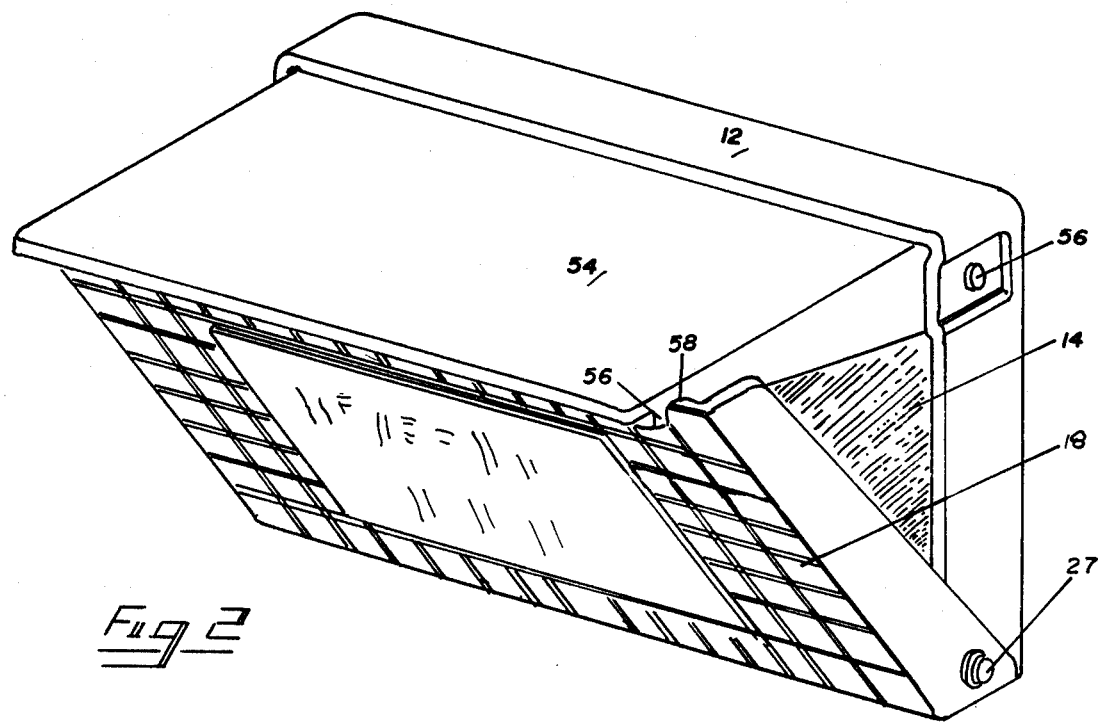
Fig 2

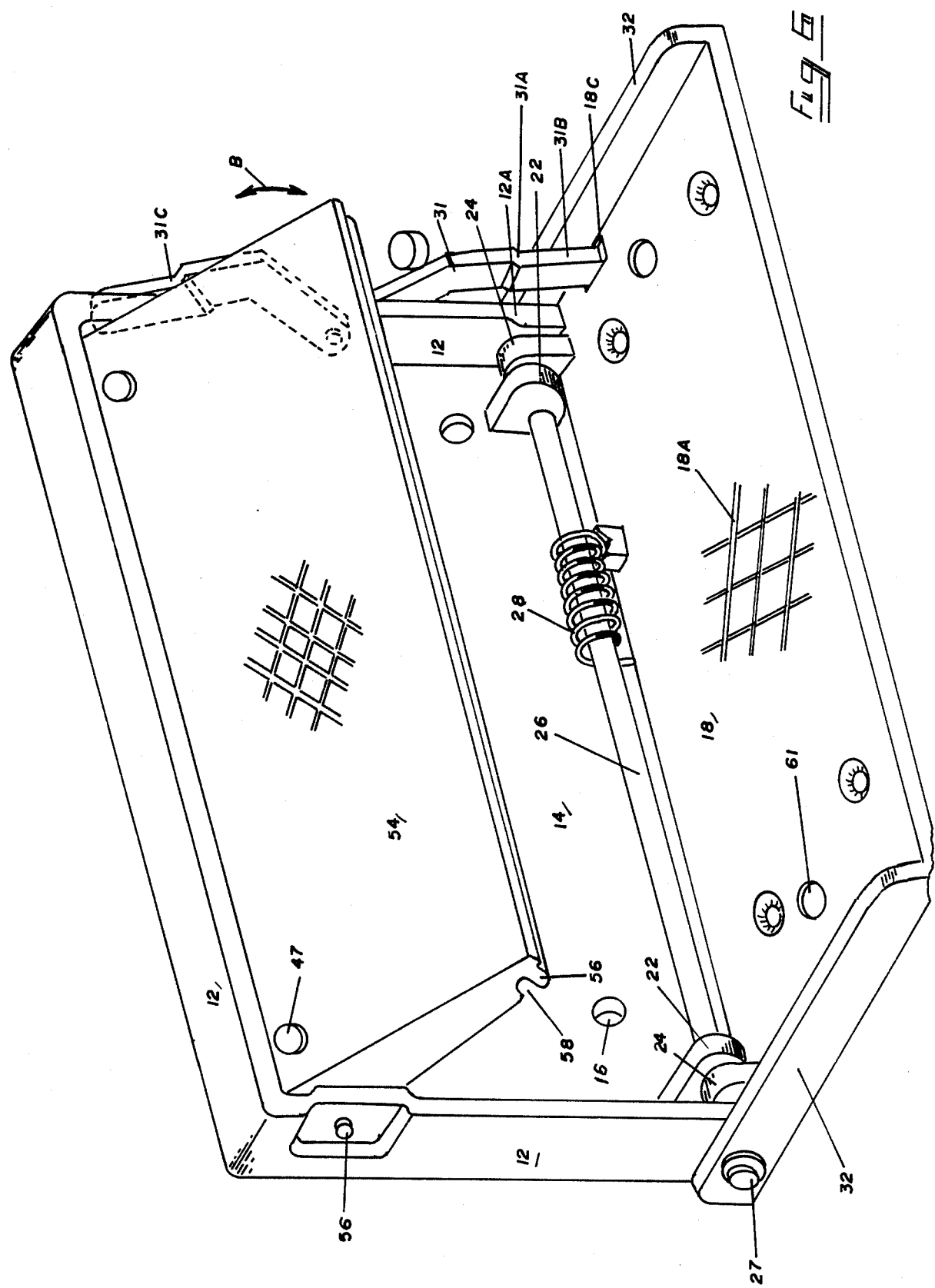

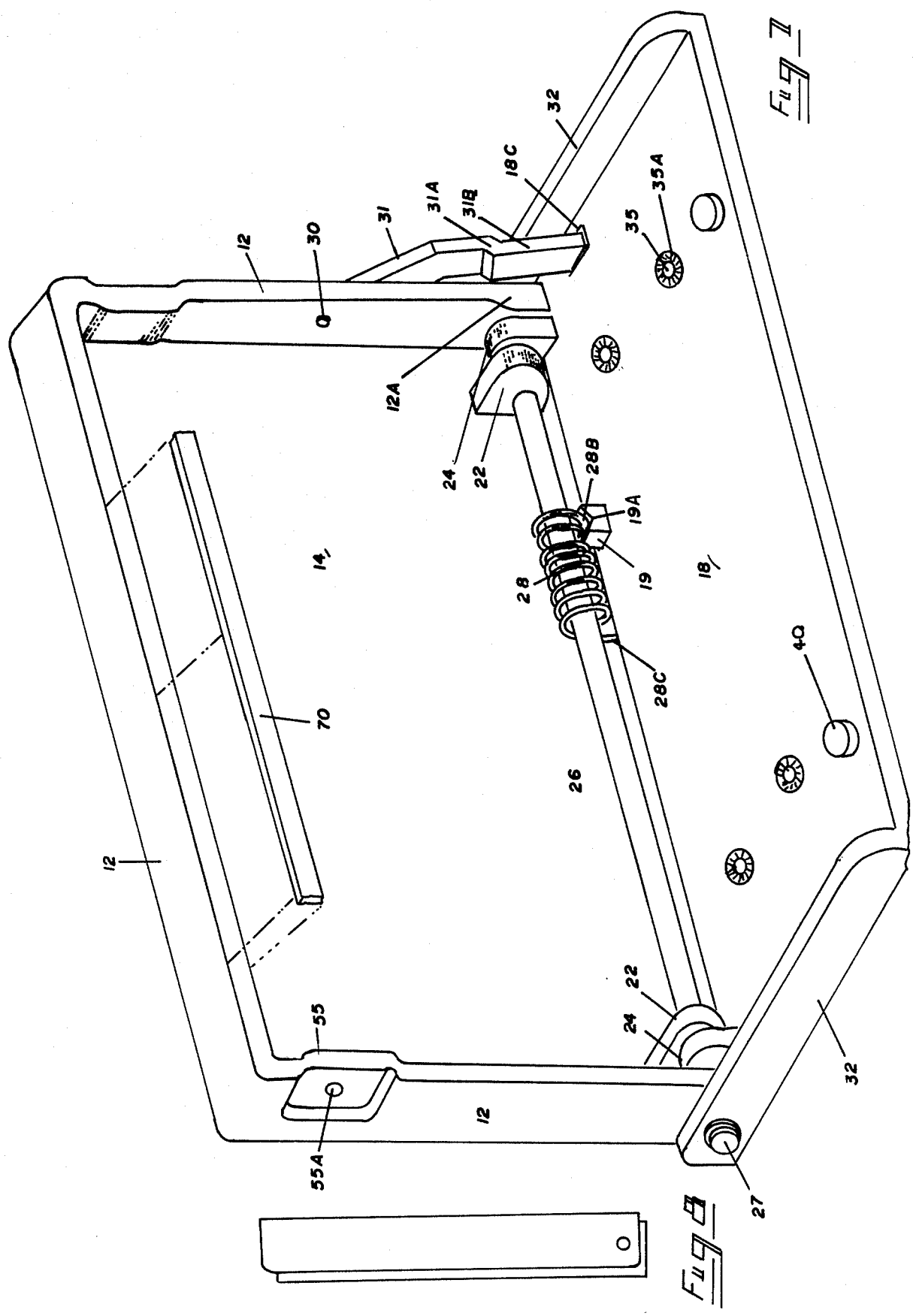

BUMPER MOUNTED FOLDING STEP ASSEMBLY

BACKGROUND OF THE INVENTION

This application is a continuation-in-part of my co-pending application Ser. No. 646,017, filed Aug. 15, 1984.

This invention relates generally to foldable or hide-a-way steps for vehicles such as trucks and campers to provide a convenient step arrangement for cleaning windshields and adjusting wiper blades when in an extended position and which can, for example provide a license plate mount when in a closed or retracted position.

Generally speaking, foldable bumper mounted steps for camper vehicles are known in the prior art. One such example is the camper step disclosed in U.S. Pat. No. 3,394,947 issued to W. H. Strube, Sr. on July 30, 1968. In this example, a first step overlies the rear bumper of a camper and is pivotally connected to a vertically downwardly extending riser which is, in turn, hingably connected to a second step located substantially below the lower margin of the bumper. The two steps and riser may be folded upon themselves and manually lifted so as to lie in a stored position on top of the bumper against the rear door of the camper where they are secured by means of a spring-loaded bolt. A removable but non-foldable bumper mounted step for a camper is disclosed in U.S. Pat. No. 3,357,719, issued to S. E. McCrea on Dec. 12, 1967.

Also of interest is the folding step construction used by swimmers to climb over the hull of a boat as disclosed in U.S. Pat. No. 2,158,949 issued to B. E. Sarles, et. al. on May 16, 1939 which consists of a supporting plate mounted against a boat hull to which a step is hingably connected.

Also, U.S. Pat. No. 4,172,611, Krus, discloses a fold down license plate holder while U.S. Pat. Nos. 1,953,298, Goodwin; 3,171,671, Cornett and 4,198,070, Weiler discloses fold down steps.

Additionally, U.S. Pat. No. 2,742,662 Lyons, French Pat. 1,570,637 and Canadian Pat. No. 885,350 disclose related subject matter.

None of the previously mentioned prior art folding step arrangements teaches or illustrates arrangements to provide protection of the device from the elements while allowing means for mounting a license plate or other sign to the assembly so as to be viewable when the assembly is disposed in a stored position. Moreover, none of the reference prior art devices teaches a two step arrangement including the use of biasing means to bias one step to a vertical position so the step itself returns to the vertical or storage position and where a first lower step can be utilized as a support for a second higher step and where elastomeric bumper means and weatherproofing means are provided to improve operability of the device.

My invention substantially overcomes the deficiencies in bumper mounted folding step construction known in the prior art.

SUMMARY OF THE INVENTION

The present invention provides a step assembly connectable to a vehicle, for example, to the bumper of a truck, bus or camper to enable a person to stand thereon to, for example, reach the windows of the vehicle to clean the same, adjust the windshield wiper blades or to perform other functions.

The present invention further provides a step assembly having a folding step assembly including a first step which can be stored in a vertical position against a base connected to a vehicle bumper when not in use in a position such that a license plate or other sign can be connected to the bottom surface of the folding step to be viewable when the step assembly is collapsed. The devices provided by the present invention also provide weatherproofing of the step assembly and arm means to lock the first step in the extended position.

The present invention also provides a step assembly connectable to a vehicle where a second step is located higher than the first step where the first step supports the second step in a horizontal position and where weather proofing and cushioning means are provided to facilitate operation of the device.

Briefly, the present invention provides a folding foot platform assembly adapted for attachment to a bumper of a vehicle with a base having an outwardly extending peripherial flange, is attached to the bumper, for example in the area where a license plate is normally connected. A first flat plate forming a first step is hingably connected to a lower edge portion of the base by a hinge device and adapted to be tilted between an extended horizontal position and a stored vertical position against the flange of the supporting plate. A bias device such as a spring is fitted around the hinge pin to bias the first step to a normally vertical position generally parallel to the supporting plate with the step abutting the flange. A second step can be provided so when the first step is pivoted to an angular position, relative to a horizontal position, the outer edge of the first step engages a notch of the second step which is hingably connected to an upper edge portion of the base to support the second step which can be pivoted from a first position parallel to the base in a position extending horizontally outwardly from the base. Elastomeric bumper means can be provided on the base to engage the second step when the second step is in the vertical position. The first and the second steps can include elastomeric bumper means to engage the other step to prevent rattling in the stored position.

These and other objects, features and advantages of my invention will become apparent to those skilled in the art by the following detailed description and attached drawings which are by way of example only and not by way of limitation.

BRIEF DESCRIPTION OF THE DRAWINGS

FIG. 1 shows a combination folding step and license plate mount attached to the front bumper of a truck, to illustrate one preferred embodiment of the present invention;

FIG. 2 illustrates a perspective view of one example of a folding step in accordance with the present invention in its open position;

FIG. 6 is a view of the arrangement shown in FIG. 2 in open position;

FIG. 7 is a view of a one step device in accordance with the present invention in open position;

FIG. 8 is a side view of the arrangement shown in FIG. 7 in closed position; and FIG. 9 is an illustration of one means of adjusting a device within the scope of the present invention.

DETAILED DESCRIPTION OF THE DRAWINGS

Figure 3:
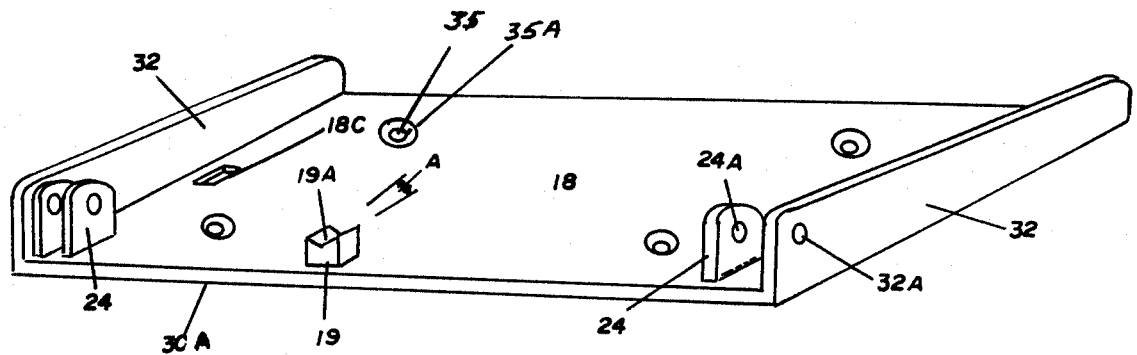
FIG. 3 is a top perspective view of the lower step of the arrangement shown in FIG. 2.

FIG. 1, shows one preferred embodiment of the present invention, illustrating a folding step assembly attached to a front bumper 20 of a vehicle 2. The assembly 10 (FIGS. 2, 6 and 7) includes a relatively flat base 14 containing holes 16 in which suitable fasteners, such as bolts, may be inserted to attach base plate 14 to, for example the bumper 20, as shown in FIG. 1. A license plate can also be attached to the outer surface of the device. As shown in FIGS. 2, 5, 6 and 7 an outwardly extending peripherial flange 12 (FIG. 2 and 5) is provided to extend around three sides of plate 14 to receive a pivotable step as described hereinafter. Edge bosses 12A are provided at the ends of flange 12 (FIG. 5, 6 and 7) and have holes 15 in aligned relation. Second bearings 22 are provided on plate 14 inset from bosses 12A and have holes 22A, FIG. 5, so that a pin means 26 (FIG. 3, 6 and 7) can be received in the boss holes 15 and the bearing holes 22A to pivotably mount first step 18 (FIG. 3) to base 14 at each end as described hereinafter and shown in FIGS. 2, 6 and 7.

The first step 18 is hingably connected along its lower edge portion to a lower edge portion of the supporting base 14 by pin 26 inserted through holes 15 of boss 12A and holes 22A of bearing 22. In the present example of my invention, cooperative bearings 24 (FIG. 3, 6 and 7) are carried by lower step 18 to be received between ends of the boss 12A and bearings 22 with holes 24A, 22A, 15 in aligned relation between bearings 12A and 22 where holes 24A (FIG. 3) are located in aligned relation with holes 22A and 15 when the unit is assembled as in FIGS. 2, 6 and 7. Flanges 32 extend upwardly from step 18 and are located on the outside of each of the flanges 12 of base 14. Holes 32A (FIG. 3) are provided in flanges 32 to be located in aligned relation with holes 12A, 15, 22A and 24A so that pin means 26 can be inserted through all bearings. End caps 27, FIG. 2 may be provided and snap-fitted onto the outside ends of hinge pin 26 on opposite sides of flanges 32.

In accordance with another feature of the present invention bias means are provided to urge step 18 to vertical position. In the example shown in FIG. 6 and 7 a coiled spring 28 is provided on pin means 26 between the bearings 22 to urge step 18 to vertical position. Spring 28 is advantageously provided with sufficient torque to cause the step 18 to tilt to the vertical position shown in FIG. 9 when not biased to another position but to permit the step to be moved to the horizontal position as shown in FIGS. 6 and 7 with minimal effort.

One end 28B of spring 28 is received in a notched foot 19 of step 18 (FIGS. 6 and 7) and the other end engages base 14. Foot 19 has a notch 19A which, advantageously, is inclined at an angle A (FIG. 3) relative to the plane of step 18 to receive end 28B of spring 28 to properly orient and retain the spring end. Likewise, the opposite end 28A of spring 28 is located to engage the surface of base 14 as shown.

Step 18 of the present example can be cast in a raised diamond pattern 18A (FIG. 6) to prevent slipping. The bottom surface 30 (FIG. 2) of the step 18, may be adapted to receive a license plate or have other designation cast therein as shown in FIG. 3 and can also have a checkered pattern 30A (FIG. 2) cast in the metal for ornamental purposes. When the entire surface is painted and then sanded the paint remains in the grooves to emphasize the pattern.

Holes 35 can be drilled through the step 18 (FIGS. 3, 6) to receive fasteners (not shown) to secure, for example, a license plate to the bottom surface 30 so the plate can be seen when the step is in the vertical or stored position. Chamfers 35A can be provided around the hole 35 on the innermost side of plate 18 so that if a license plate or other sign is attached to the plate 18 flat head screws can be used to attach the plate so the screw heads will be flush with the inner surface of plate 18.

Thus the unit can be assembled so that step 18 is pivotably connected to base 14 and is biased to a normal vertical position or turned to a horizontal position to provide a step.

When the first step 18 is to be extended to its horizontal position for use as a foot platform, a latch assembly can be, provided as shown in FIGS. 6 and 7 having a first segment 31 connected to flange 12 on the outer side of flange 12 by a pin 30. Latch 31 is located between the outer surface of flange 12 with an offset 31A to a second segment 31B located in the inner surface of the adjacent sidewall 32 of step 18 so that when in the locked position, as shown in FIGS. 6 and 7, second segment 31B engages a recess 18C in the surface of platform 18 to securely receive end 31B. Latch 31, as shown is advantageously stored as shown in sections lines as element 31A so that when stored as shown in FIG. 6, the end section 31B engages the outer surface of flange 12 to retain the latch in stored condition because of the offset 31A.

When step 18 is in the position shown in FIGS. 6 and 7, the rear edge of the step engages the bottom edge portion of base 14 which acts as a stop to restrain the first step 18 from tilting downwardly below the horizontal when supporting a person's weight.

It has been further found that the use of the flange assembly 12 on base 14 and flange 32 on step 18 provides a weather resistant arrangement which is not prone to icing over in foul weather. Also, bumpers 40 can be provided as shown in FIG. 7 to engage the outer surface of flange 12 when step 18 is in the vertical position as shown in FIG. 8. Alternatively a gasket 70 as shown in FIG. 7 can be provided along at least a portion of the edge of flange 12 to contact step 18 to cushion contact between step 18 and flange 12 and to prevent entry of water into the assembly.

Notwithstanding the previously described features of the foregoing embodiment of my invention, particularly short persons such as children and may women may still find it difficult to reach the furthest portions of some vehicle windshields when attempting to clean the same while standing on the step 18 because the step 18, when in its extended position along is located a lower edge portion of the bumper 20. Such persons will find the additional feature of a second step in accordance with the present invention as shown in the Figures particularly advantageous.

Accordingly, a second step 54 of generally flat, rectangular, rigid material can be hingedly connected along its upper edge portion to flange 12 of base 14 by means of cooperative hinge pin 56, FIGS. 2 and 6, received in holes 55A of bosses 55, FIG. 3, provided in flange 12 and pivot holes 60A of bosses 60 of step 54, so that the underside of step 54 will lie flat against base 14 when moved as shown by arrow B to a stored position (FIG.

6). Holes 60A provided in bosses 60 at each end of flanges 59 of step 54 are located in alignment with holes 55A to receive pin 56.

Figure 4:
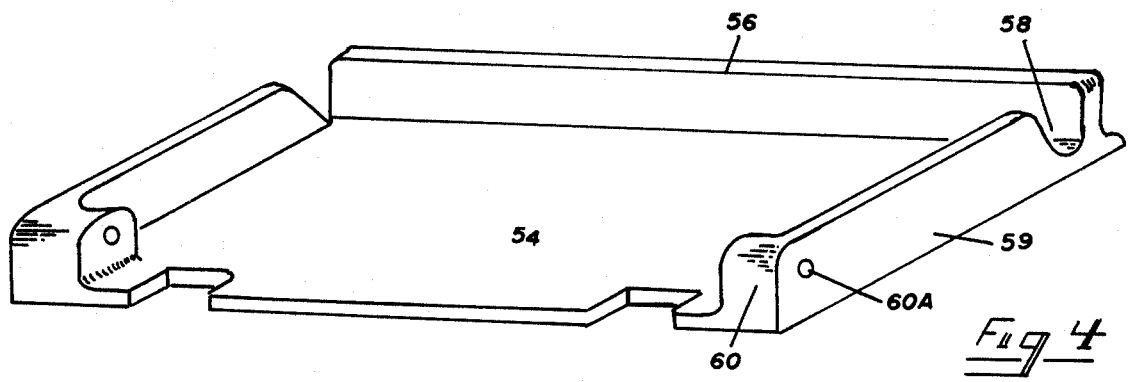
FIG. 4 is a bottom perspective view of the upper step shown in FIG. 2.
Figure 5:
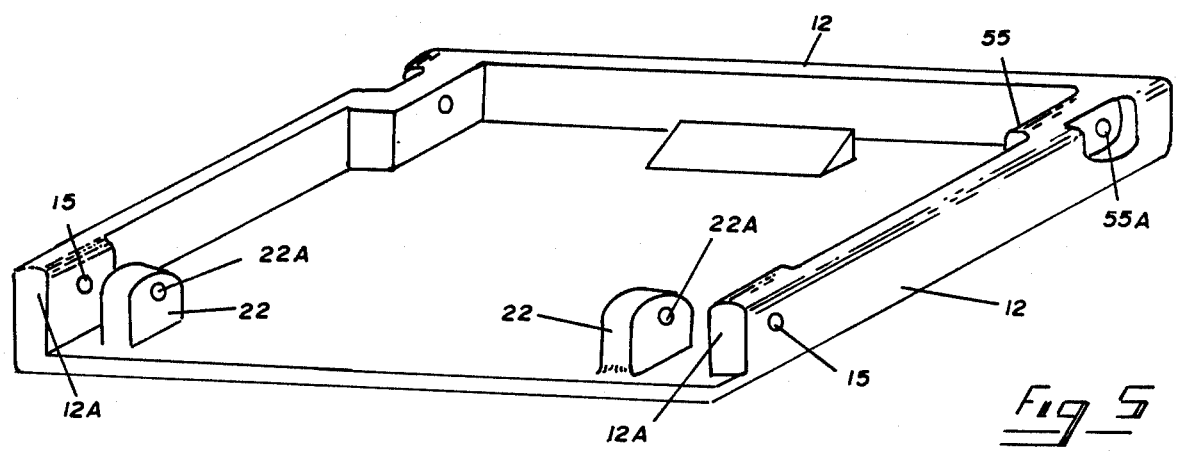
FIG. 5 is a front perspective view of a base plate in accordance with the present invention.

To use second step 54, step 18 is lowered and step 54 lifted so that the outer free edge of the first step 18 can be tilted upwardly into alignment with a slot 58 formed behind lip 56 in front of side flanges 59 of second step 54, as shown in FIG. 4. Second step 54 is then lowered until the free end of step 18 inserts into the slot 58 between lip 56 and flanges 59 to lock the second step 54 in a secure, horizontal position as shown in FIG. 2. The first step 18 and the support 63 act as supporting members for the second step 54 when the latter is in use.

Because the second step 54 is higher in elevation than the first step 18 (when the latter is in its extended position) shorter persons will prefer its use in cleaning some vehicle windshields. Others may simply prefer to leave the second step 54 in its stored position and use the first step 18 or devices within the scope of the present invention may use only step 18.

In accordance with another feature of the present invention the position of base 14 can be maintained in a vertical position with respect to a slanted surface 77 as shown in FIG. 9 where nuts 72, 73 are provided on opposite sides of plate 14 to receive a bolt 74 having a nut 76 at the end thereof to engage a bumper 77, which is not vertical, so that the plate 14 remains vertical and held in place by other bolts extending through the upper holes 16 of plate 14.

Also in accordance with another feature of the present invention as shown in FIG. 6 elastomeric bumpers 47 can be provided on the outer surface of step 54 to be engaged by the innerside of step 18 when step 54 is in the lowered position with step 18 folded inward to prevent the step from rattling in the closed position. Bumpers 47 are received in recesses provided in step 54 and can be held by adhesive so that the use of the recess and adhesive makes it difficult to dislodge the bumpers. Also elastomeric bumpers 61 can be provided in step 18 to engage the outer surface of step 54 in the closed condition and a bumper 63 can be provided in plate 14 to engage lip 56 of step 54.

The arrangement shown will permit first step 18 to tilt fully upward to close against the step 54 to display a license plate or other sign on the bottom surface thereof as previously described yet the assembly will not rattle or make noise because of the use of the elastomeric bumpers as previously described.

Although the present invention has been described with respect to specific details of certain preferred embodiments thereof, it is not intended that such details limit the scope of the present invention otherwise than as is set forth in the following claims.

I claim:

1. A step assembly for attachment to a bumper of a vehicle comprising base means having upper and lower edges with side edges and laterally outwardly extending side flange means located at said side edges where said base means is adapted for connection to said bumper; first step means having a width greater than the distance between said side edges; first hinge means located between said upper and lower edges of said base means to hingebly connect said first step means to said base means whereby said first step pivots along an axis parallel to said lower edges of said base to permit said first step to tilt between a relatively vertical stored position and a relatively horizontal extended position, where said first step includes stop means to engage said base means at a point between said hinge means and said lower edge when said first step is in said horizontal position to prevent said step from tilting substantially below horizontal; biasing means connecting to said first step for urging said first step to said vertical position; and top flange means extending laterally outwardly from said top side of said base means to engage said first step when said first step is in said vertical position to protect the surface of said first step from the elements.

2. The invention of claim 1 including elongate arm means having first and second ends and pivotably connected at said first end to said base means and rotatable between a first position to allow said second end thereof to engage said first step when said first step is in horizontal position to overcome the force of said bias means to hold said first step in horiztonal position, and second stored position.

3. A step assembly for attachment to a bumper of a vehicle comprising base means having upper and lower edges with said edges and laterally outwardly extending side flange means located at said side edges where said base means is adapted for connection to said; bumper first step means having a width greater than the distance between said side edges; first hinge means located between said upper and lower edges of said base means to hingebly connect said first step means to said base means whereby said first step pivots along an axis parallel to said lower edge of said base to permit said first step to tilt between a relative vertical stored position and a relatively horizontal extended position, where said first step includes stop means to engage said base means at a point between said hinge means and said lower edge when said first step is in said horizontal position to prevent said step from tilting substantially below horizontal; biasing means connected to said first step for urging said first step to said vertical position; and top flange means extending laterally outwardly from said top side of said base means to engage said first step when said first step is in said vertical position to protect the surface of said first step from the elements; the step assembly further including second step means having a width less than the width between said side flanges; second hinge means received by said side flanges to hingably connect said second step means adjacent upper edge portion of said base for allowing said second step to tilt between a stored position, relatively flush against said base and said first step and received between said side flanges and below said top flange, to an extended position at least slightly above a plane perpendicular with said base means; and latch means for supportably securing a free edge portion of the bottom of said second step against the outer edge of said first step when said first step is disposed at an acute angle relative to said base to support said second step in a relatively horizontal position.

4. The step assembly of claim 1 including tapered sidewalls extending along the side edges of said first step adjacent said support and adapted to journal said hinge means.

5. The invention of claim 1 wherein said biasing means and said first hinge means comprise a first pair of bearing assemblies attached to said lower edge portion of said base means, a second pair of bearing assemblies attached to said side flanges, said first and second pairs of said bearing assemblies being in aligned relation, a hinge pin connected through and between said first and second pairs of bearing assemblies and a coiled spring disposed around said hinge pin between each of said bearing assembly pairs, one free end of said spring lying against said base and an opposite free end of said spring lying against said first step, for maintaining said first step in a generally vertical position.

6. The invention of claim 5 including "V" shaped notch means carried by said first step to receive said opposite free end of said coiled spring.

7. The invention of claim 6 including means for supportably securing said free edge portion of said second step in said horizontal position which includes groove means adjacent the free edge of said second step and detent means carried by the free edge of said first step to be received in said groove means whereby said second step is supported in horizontal position when said first step is at a selected acute angle relative to said base means.

8. The assembly of claim 1 further comprising means for fastening a sign means to a bottom surface of said first step such that said sign means is readily viewable when said foot platform is disposed in said relatively vertical stored position.

9. The invention of claim 8 wherein said sign means is cut into said bottom surface of said step.

10. The invention of claim 1 including threaded post means to be received in threaded apertures in said base plate to be extended. and retracted to adjust the orientation of said base plate to the horizontal position.

* * * * *